United States Patent
Borel et al.

(10) Patent No.: US 9,658,395 B2
(45) Date of Patent: May 23, 2017

(54) LOW LOSS OPTICAL FIBER AND METHOD OF MAKING THE SAME

(71) Applicant: OFS Fitel, LLC, Norcross, GA (US)

(72) Inventors: Peter I Borel, Frederiksberg (DK); Rasmus V. S. Jensen, Frederiksberg (DK); Ole A Levring, Virum (DK); Jorgen Ostgaard Olsen, Copenhagen (DK); David W Peckham, Lawrenceville, GA (US); Dennis J Trevor, Clinton, NJ (US); Patrick W Wisk, Greenbrook, NJ (US); Man F Yan, Berkeley Heights, NJ (US)

(73) Assignee: OFS FITEL, LLC, Norcross, GA (US)

(*) Notice: Subject to any disclaimer, the term of this patent is extended or adjusted under 35 U.S.C. 154(b) by 0 days.

(21) Appl. No.: 14/825,297

(22) Filed: Aug. 13, 2015

(65) Prior Publication Data
US 2016/0109651 A1    Apr. 21, 2016

Related U.S. Application Data

(60) Provisional application No. 62/066,520, filed on Oct. 21, 2014, provisional application No. 62/072,606, filed on Oct. 30, 2014.

(51) Int. Cl.
*G02B 6/036* (2006.01)
*C03B 37/027* (2006.01)
(Continued)

(52) U.S. Cl.
CPC ...... *G02B 6/0365* (2013.01); *C03B 37/01446* (2013.01); *C03B 37/01453* (2013.01);
(Continued)

(58) Field of Classification Search
CPC .................. G02B 6/036; G02B 6/027
(Continued)

(56) References Cited

U.S. PATENT DOCUMENTS

| 4,282,196 A | 8/1981 | Kometani et al. |
| 4,738,873 A | 4/1988 | Roba et al. |

(Continued)

FOREIGN PATENT DOCUMENTS

| EP | 1 154 294 A1 | 11/2001 |
| EP | 1 191 368 A2 | 3/2002 |
| EP | 2 511 741 A2 | 10/2012 |

OTHER PUBLICATIONS

Tateda, et al., "Design of Viscosity-Matched Optical Fibers", IEEE Phonotics Technology Letters, vol. 4, No. 9, Sep. 1992, pp. 1023-1025.

(Continued)

*Primary Examiner* — Kaveh C Kianni
(74) *Attorney, Agent, or Firm* — Wendy Koba, Esq.

(57) ABSTRACT

The core region of an optical fiber is doped with chlorine in a concentration that allows for the viscosity of the core region to be lowered, approaching the viscosity of the surrounding cladding. An annular interface region is disposed between the core and cladding and contains a concentration of fluorine dopant sufficient to match the viscosity of the core. By including this annular stress accommodation region, the cladding layer can be formed to include the relatively high concentration of fluorine required to provide the desired degree of optical signal confinement (i.e., forming a "low loss" optical fiber).

17 Claims, 5 Drawing Sheets

(51) Int. Cl.
*C03B 37/014* (2006.01)
*C03B 37/018* (2006.01)
*C03C 13/04* (2006.01)
*G02B 6/02* (2006.01)

(52) U.S. Cl.
CPC .. *C03B 37/01853* (2013.01); *C03B 37/01861* (2013.01); *C03B 37/01869* (2013.01); *C03B 37/01892* (2013.01); *C03B 37/027* (2013.01); *C03C 13/045* (2013.01); *G02B 6/02019* (2013.01); *C03B 2201/12* (2013.01); *C03B 2201/20* (2013.01); *C03B 2203/22* (2013.01); *C03B 2203/222* (2013.01); *C03B 2203/223* (2013.01); *C03B 2205/40* (2013.01); *C03B 2205/42* (2013.01); *C03C 2201/11* (2013.01); *C03C 2201/12* (2013.01); *C03C 2203/44* (2013.01); *C03C 2203/46* (2013.01); *G02B 6/03683* (2013.01); *G02B 6/03694* (2013.01); *Y02P 40/57* (2015.11)

(58) Field of Classification Search
USPC .......................................................... 385/128
See application file for complete search history.

(56) References Cited

U.S. PATENT DOCUMENTS

| | | | |
|---|---|---|---|
| 6,343,175 B1 | 1/2002 | Sasaoka | |
| 6,862,900 B2 | 3/2005 | de Sandro et al. | |
| 6,917,740 B2 | 7/2005 | Bock et al. | |
| 7,010,203 B2 | 3/2006 | Yokokawa et al. | |
| 7,593,612 B2 | 9/2009 | Shimotakahara | |
| 7,752,870 B1 | 7/2010 | Homa | |
| 7,929,818 B1 | 4/2011 | Bickham et al. | |
| 8,687,936 B2 | 4/2014 | Nakanishi et al. | |
| 8,837,889 B2 | 9/2014 | de Montmorillon et al. | |
| 2002/0031320 A1* | 3/2002 | Nagayama et al. | 385/127 |
| 2002/0044753 A1* | 4/2002 | Nagayama et al. | 385/123 |
| 2004/0240814 A1* | 12/2004 | Boek et al. | 385/123 |
| 2008/0285929 A1* | 11/2008 | Shimotakahara | 385/127 |
| 2011/0222828 A1* | 9/2011 | Sasaoka et al. | 385/127 |

OTHER PUBLICATIONS

Kakiuchida, et al., "Refractive Index and Density in F- and Cl-Doped Silica Glasses", Applied Physics Letters 86, 161907 (2005).

Kakiuchida, et al., "Rayleigh Scattering in Fluorine-Doped Silica Glass", Applied Physics, vol. 42, pp. 6516-6517, Part 1, No. 10, Oct. 2003.

Ohashi, et al., "Imperfection Loss Reduction in Viscosity-Matched Optical Fibers", IEEE Photonics Technology Letters, vol. 5, No. 7, Jul. 1993.

Kakiuchida, et al., "Effect of Chlorine on Rayleigh Scattering Reduction in Silica Glass", Applied Physics, vol. 42, pp. L1526-L1528, Part 2, No. 12B, Dec. 15, 2003.

Sillard, et al., "Micro-Bend Losses of Trench-Assisted Single-Mode Fibers", ECOC 2010, Sep. 19-23, 2010, Torino Italy.

* cited by examiner

LOW LOSS OPTICAL FIBER AND METHOD OF MAKING THE SAME

CROSS-REFERENCE TO RELATED APPLICATIONS

This application claims the benefit of U.S. Provisional Application Ser. No. 62/066,520, filed Oct. 21, 2014 and U.S. Provisional Application Ser. No. 62/072,606, filed Oct. 30, 2014, both of which are herein incorporated by reference.

TECHNICAL FIELD

The present invention relates to low loss optical fibers and, more particularly, to a Germanium (Ge)-free optical fiber that is doped with selected amounts of Chlorine (Cl) and Fluorine (F) in a manner that provides for improved viscosity matching between the core and cladding during fiber draw.

BACKGROUND OF THE INVENTION

One conventional type of optical fiber has a refractive index profile designed to confine a propagating optical signal in the core region by adding germanium dopant to the silica glass of the core, thereby increasing the refractive index of the core with respect to the surround cladding layer. The germanium dopant, however, has been found to introduce optical loss to the propagating signal (the germanium increasing Rayleigh scattering of the light within the core). To overcome this problem, some optical fibers have been constructed with a pure silica core (i.e., a "Ge-free" core), thus minimizing losses attributed to scattering and the like. When using a pure silica core, a specialized cladding material is required that will function to confine the propagating optical mode to the core region by decreasing the refractive index of the cladding with respect to the core (referred to in the art as "down doping" of the cladding). Fluorine is one dopant that has been useful for this purpose, where the inclusion of fluorine dopant in the silica glass forming the cladding layer will decrease the refractive index of the cladding relative to the core, providing optical signal confinement within the core.

While useful in providing a low loss fiber structure with a Ge-free core, the arrangement of a pure silica core surrounded by an F-doped cladding has exhibited problems related to its fabrication. Since F-doped silica has a lower viscosity than pure silica, the act of heating an optical preform and then drawing the preform down into an optical fiber creates a situation where the more rigid core will support a majority of the draw tension, resulting in significant index reduction and high residual stress in the core region. This mechanical stress, in turn, creates glass defects that behave as scattering sites and thus increase optical attenuation.

Presently, the best solution to this residual stress problem is to reduce the draw tension by increasing the draw temperature and/or decreasing the rate at which the fiber is drawn-increasing manufacturing costs as a result.

U.S. Pat. No. 6,917,740 issued to H. D. Boek et al. on Jul. 12, 2005 addresses the viscosity mismatch problem present in a Ge-free optical fiber, and proposes the use of a core region that is co-doped with both chlorine and fluorine. The inclusion of chlorine in the core thus improves viscosity matching to the cladding and reduces the residual stress that would otherwise be present in the drawn fiber. However, the inclusion of these dopants in the core region allows for the optical power to spread into the cladding (since the refractive index difference is somewhat lessened), thus reducing the optical power present within the core region and increasing the optical power in the cladding region, resulting in a higher fiber attenuation. Additionally, the smaller index difference between the core and cladding regions further increases the bending losses found in the fiber.

Various other prior art techniques have been proposed to reduce the viscosity mismatch in optical fibers. See, for example, an article entitled "*Design of Viscosity-Matched Optical Fibers*" by M. Tateda et al., appearing in *IEEE Photonics Technology Letters*, Vol. 4, No. 9, September 1992 at pp. 1023 et seq.

A technique for addressing the residual tension present in a fiber drawn from a viscosity mismatched preform is described in U.S. Pat. No. 7,593,612 issued to I. Shimotakahara on Sep. 22, 2009. Here, a tension-absorbing cladding layer is included as an outer jacket over a conventional cladding layer, where the tension absorbing outer jacket is formed of a material that exhibits a refractive index similar to the core (such as, for example, a pure silica tension absorbing layer). During draw, the mechanical stress forces present between the mismatched core and cladding will be transferred away from the core and be absorbed through the interaction between the outer jacket and the cladding. While capable of mitigating the degree of draw-induced stress, the outer jacket is itself formed of a rigid material that necessitates a higher draw temperature that will increase the glass fictive temperature, resulting in higher attenuation. Furthermore, the addition of the tension-absorbing layer increases processing complexities. The higher index of the tension-absorbing layer relative to that of the cladding layer can also lead to power leakage from the core to the tension-absorbing layer, especially in a tightly-bent fiber; and that results in a high bending loss.

SUMMARY OF THE INVENTION

The present invention addresses these and other problems and relates to a Germanium (Ge)-free optical fiber that is doped with selected amounts of Chlorine (Cl) and Fluorine (F) in a manner that provides for improved viscosity matching between the core and cladding during fiber draw while also minimizing the amount of optical power that is present in the cladding.

In accordance with the present invention, the core region of an optical fiber is doped with chlorine in a concentration that allows for the viscosity of the core region to be lowered, preferably matching the viscosity of an F-doped cladding region. An annular interface region (hereinafter referred to as a "stress accommodation" region) is disposed between the Cl-doped core and a heavily F-doped cladding region. The annular stress accommodation region includes a moderate concentration of fluorine dopant (i.e., sufficient to match the viscosity of the core, but less than the heavier concentration used in the cladding to create the necessary refractive index difference for waveguiding within the core). The inventive configuration reduces the fiber attenuation, since the viscosity-matched core and the immediately adjacent annular stress accommodation region significantly reduces the stress that would otherwise be created during fiber draw. The surrounding cladding layer is more highly doped with fluorine, providing the refractive index difference with respect to the Cl-doped core that is necessary to maintain optical signal mode confinement within the core region and immediately adjacent annular region.

It is also possible, in some embodiments of the present invention, to include F-dopant in the core region, creating a co-doped core. This embodiment is considered to be appropriate for long distance transmission applications where low latency requirements are important.

It has been found that the inclusion of the stress accommodation annular region significantly reduces the amount of optical power that is present within the cladding when compared to prior art arrangements. Indeed, it has been found that configurations of the present invention exhibit a power fraction of less than 2% in the cladding regions, where prior art fibers often have power fractions of 10-20% (perhaps more) present within the cladding—a significant source of loss in the fiber. Stated another way, the power fraction present within the core/annular region combination of the inventive fiber is significantly higher than the power fraction associated with the core region of conventional fibers. Furthermore, the higher index of the annular region relatively to the cladding effectively increases the core diameter, resulting in a larger effective area that is advantageous in transmission fiber applications.

Various fabrication techniques, such as modified chemical vapor deposition (MCVD), vapor-assisted deposition (VAD) and the like may be used to create an optical fiber preform from which an optical fiber formed in accordance with the present invention may be drawn, the draw rate being maintained at the relatively high values associated with an optimum manufacturing process.

Indeed, a particular embodiment of the present invention comprises optical fiber including a chlorine-doped silica core region, an annular stress-accommodation region surrounding the core region and doped with a moderate concentration of a fluorine dopant sufficient to exhibit a viscosity similar to the Cl-doped core region, and a heavily F-doped cladding layer disposed to surround the annular stress accommodation region where the dopant concentration in the cladding layer is sufficient to provide for optical mode confinement within the core region.

Other and further advantages and features of the present invention will become apparent during the course of the following discussion and by reference to the accompanying drawings.

BRIEF DESCRIPTION OF THE DRAWINGS

Referring now to the drawings,

FIG. 1 illustrates an exemplary low-loss optical fiber formed in accordance with the present invention, where

DETAILED DESCRIPTION

Figure 1A:
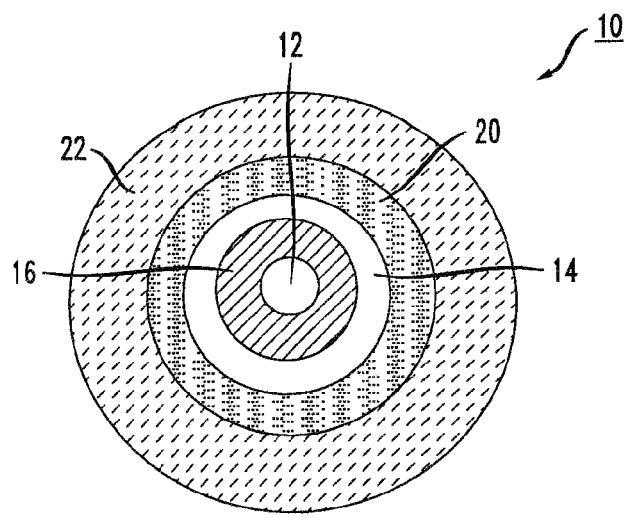
FIG. 1(a) is a cut-away view through the diameter of the optical fiber and FIG. 1(b) is a refractive index profile of this exemplary optical fiber.

It is known that optical fibers containing an undoped (i.e., pure) silica core have a lower attenuation than Germanium (Ge)-doped fibers, due to lower Rayleigh scattering within the core region. However, as mentioned above, pure silica core fibers require a lower refractive index cladding structure to provide the necessary optical mode confinement within the core region. For this reason, Fluorine (F) is often used as a dopant in the cladding layer of a pure silica core fiber, since F-doped silica exhibits a lower refractive index than pure silica. The relative difference in refractive index values between the core and cladding regions (and, therefore, the fraction of the total power remaining in the core region) being a function of the concentration of the F dopant.

Since the F-doped cladding has a lower viscosity during fiber draw, the more rigid core supports most of the draw tension, resulting in high residual stress and significant index reduction in the core region. This causes glass defects which increase optical attenuation. To mitigate the effects of such defects, the fiber must be drawn slowly, increasing manufacturing cost. Additionally, if the core is under significant residual stress, its index is suppressed in the as-drawn fiber. Thereafter, when the fiber is subjected to any high temperature process (such as annealing during a fiber splice operation), the residual stress will be relieved and the index will increase, increasing the splice loss. Meanwhile, the bulk of the fiber has too low an index difference, which causes unwanted macrobend loss.

It is known from the prior art that the addition of chlorine dopant to silica fiber significantly increases the glass relaxation rate, resulting in a lower fictive temperature $T_f$ and, therefore, a lower Rayleigh scattering in the Cl-doped optical fiber. However, the Cl-doped core exhibits a significant thermal mismatch with the surrounding deeply F-doped cladding (the deeply F-doped cladding required to provide optical mode confinement to the core region). Furthermore, as stated above, a significant fraction of the optical power propagates within the F-doped cladding (upwards of 10-20%) in these prior art fibers. The residual stress near the core-cladding interface, as well as the scattering loss due to fluorine concentration fluctuations, results in a higher attenuation.

The optical fiber and fabrication method of the present invention addresses these problems by modifying the composition of the core region of a Ge-free optical fiber to substantially reduce losses attributed to stress-related fabrication processes.

As discussed in detail below, the inventive fiber structure comprises a Cl-doped core region and a moderately F-doped annular stress accommodation region that surrounds the core, where the combination of these two regions improves the match between the material properties of the core and cladding to the point where conventional draw parameters may be used (e.g., draw temperature, tension and rate) and maintain a low-loss optical core region.

FIG. 1 illustrates an exemplary low-loss optical fiber formed in accordance with the present invention, where FIG.

Figure 1B:
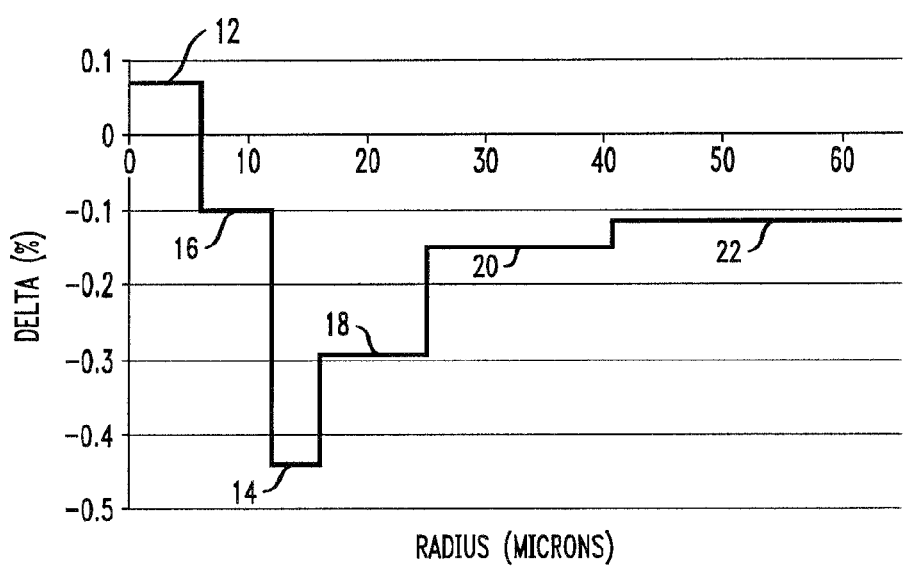

1(a) depicts a cross-sectional view of the view and FIG. 1(b) is a plot of the refractive index profile of this fiber. As will be explained in detail below, low-loss optical fiber 10 is shown as comprising a central core region 12 that is Cl-doped in order to improve viscosity matching with a surrounding F-doped cladding region 14. In accordance with the present invention, an annular stress accommodation region 16 is formed between core region 12 and cladding region 14, where annular stress accommodation region 16 is slightly F-doped; that is, doped with an amount of fluorine dopant sufficient to maintain the viscosity matching with core region 12, but less than what is required to provide the refractive index difference necessary to maintain optical mode confinement within core region 12.

Cladding region 14 is heavily doped with fluorine, as indicated by the refractive index values shown in FIG. 1, in order to create an isolation "trench" that assists in confining the propagating optical signal within core region 12 and adjacent annular stress accommodation region 16. While the exemplary embodiment as depicted in FIG. 1 includes both an inner trench 14 and outer trench 18, it is to be understood that an optical fiber formed in accordance with the present invention may comprise only a single heavily F-doped region of width approximately equal to the combination of regions 14 and 18 (with an index value falling between that of regions 14 and 18).

An outer (moderately F-doped) cladding region 20 and protective polymer coating 22 complete the structure of low-loss fiber 10, as shown in FIG. 1, where these regions exhibit conventional refractive index values. While FIG. 1(b) shows that the protective polymer coating 22 has a refractive index lower than silica, other polymer coatings—perhaps with a higher refractive index than silica—can also be used.

In accordance with the present invention, Cl-doped core glass compositions are proposed that are thermo-elastically compatible with the conventional F-doped cladding material used with pure silica core optical fibers. This compatibility allows for high speed draw processes to be used (e.g., draw rates of 3 m/s or higher) when creating the fiber from an optical preform, while preserving the desirable low loss property of the core region. Moreover, this goal is accomplished without introducing defects in the glass materials, since various intentionally-introduced defects are known to contribute to higher losses, as well as hydrogen-induced losses and/or radiation-induced losses in the fabricated optical fiber.

In particular, core region 12 is made of silica containing a high concentration of Si—Cl bonding or $SiCl_4$ dopant. As mentioned above, the thermo-elastic compatibility between core region 12 and cladding region 14 permits the use of relatively high draw rates (e.g., in excess of 3 m/s) without incurring significant draw-induced tension, and also without creating significant refractive index suppression within core region 12. The use of a Ge-free core significantly reduces the Rayleigh scattering loss in the core, resulting in optical signal attenuation of less than 0.18 dB/km at a wavelength of 1550 nm, also with little or no hydrogen-induced loss.

The utilization of a Cl-doped core region in the inventive optical fiber permits the use of relatively low draw temperatures, for example, temperatures in the range of 1800-2200° C. These low draw temperatures decrease the glass fictive temperature ($T_f$), for example to a value of about 1600° C., which lowers the attenuation in the fiber.

It is useful to note that the fictive temperature, $T_f$, varies radially in an optical fiber, since the glass compositions (as well as dopant concentrations) vary radially in forming a waveguide structure. Different dopant types and concentrations affect the rates of glass structural relaxation, resulting in different $T_f$ values at different radial positions in an optical fiber. In particular, significant $T_f$ changes occur in the core and adjacent cladding regions—the very areas within which most of the optical power propagates. It is known in the prior art that changes in $T_f$ result in changes in both the refractive indicies and glass densities. Therefore, it is desirable to minimize changes in such properties within the waveguiding regions to reduce fiber attention.

When selecting the proper concentrations of chlorine and fluorine to be used in the low-loss optical fiber of the present invention, one factor to consider is the desire to match the material properties, e.g., viscosity, density and thermal expansion coefficients (CTE) of the materials comprising the core and cladding regions in a manner that minimizes draw-induced stresses, while also reducing stress gradients over a wide range of draw conditions.

Figure 2:
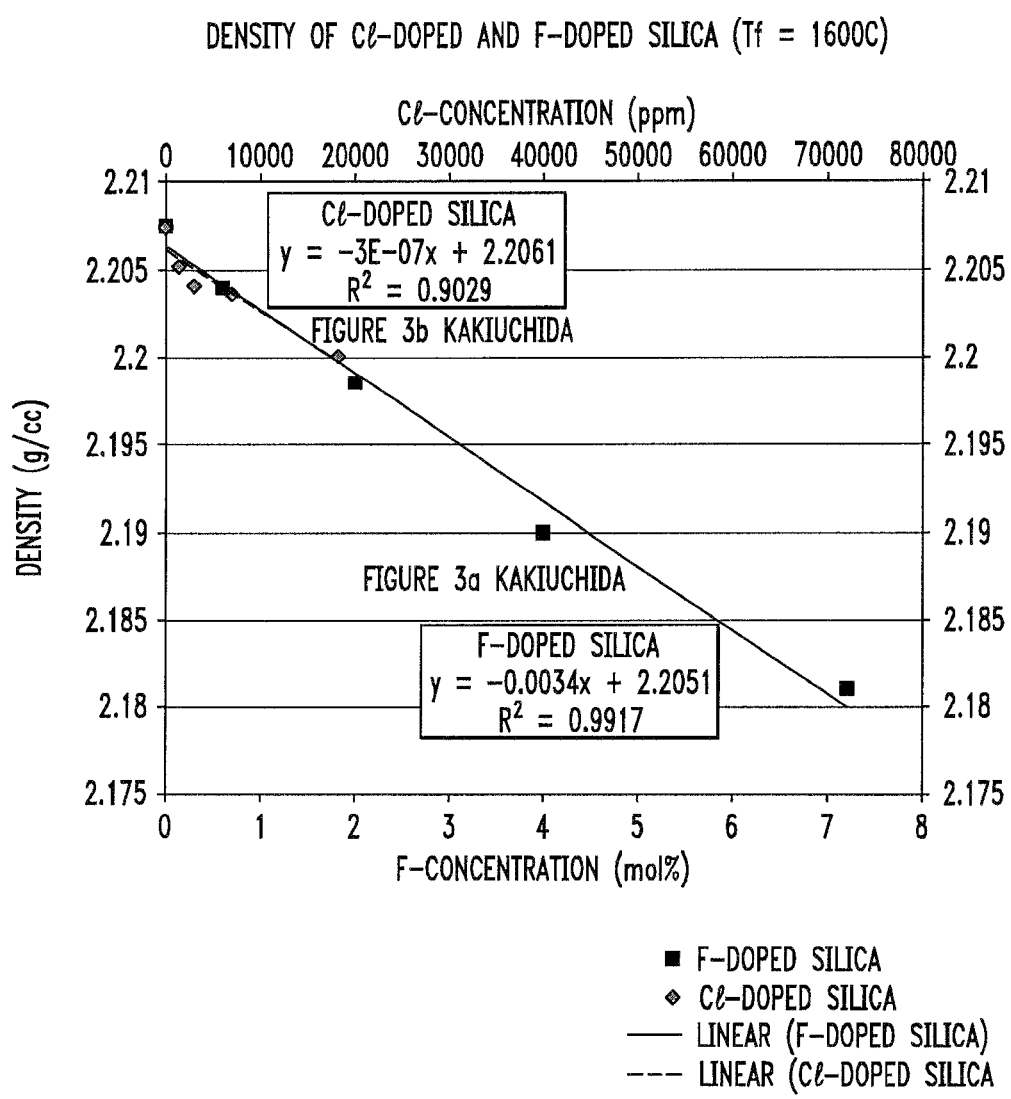
FIG. 2 is a graph including density plots of both Cl-doped silica and F-doped silica, at the fictive temperature of 1600° C.

FIG. 2 is a density plot of both Cl-doped silica and F-doped silica, measured at the fictive temperature $T_f$ of 1600° C., and plotted as a function of chlorine concentration [Cl] and fluorine concentration [F], respectively. This plot is based on experimental data published by Kakiuchida et al. in the article "*Refractive index and density in F-and Cl-doped silica glasses*", published in *Applied Physics Letters*, Vol. 86, beginning at page 161907 (2005). As indicated in region A of the density plots of FIG. 2, it is possible to control the concentrations of both dopants so that their densities are matched at the fictive temperature of 1600° C. As shown, for silica with $T_f$=1600° C., the density of Cl-doped silica with [Cl]=10,000 ppm is essentially the same as F-doped silica with [F] of approximately 1 mol %. However, the turbidity of silica increases dramatically when [Cl] increases above 15,000 ppm, leading to bubbles and possibly airlines in the drawn fiber. Thus, for the purposes of the present invention, a practical upper bound for [Cl] is selected to be 15,000 ppm, and a preferable range for preferred embodiments being about 2000 ppm to 15,000 ppm. Referring to the density plots of FIG. 2 (again based on the experimental data published by Kakiuchida et al.), for a [Cl] concentration of 15,000 ppm, the value of [F] required to maintain matching densities is about 1.5 mol %. For the purposes of the present invention, range of about 0.3 mol % to 3.0 mol % for the fluorine concentration is acceptable.

Figure 3A:
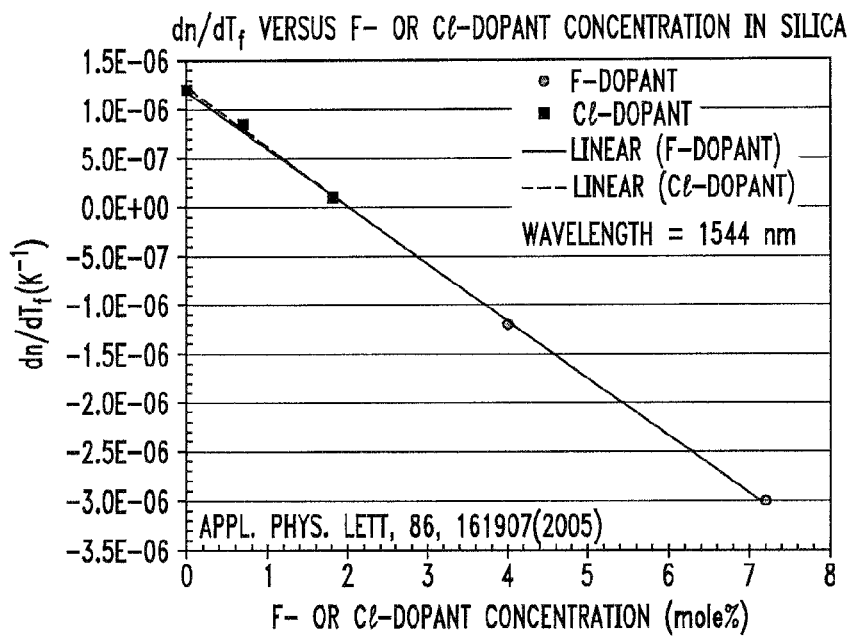
FIG. 3 contains plots exemplifying the thermo-optic coefficient (FIG. 3(a)), given as changes in the refractive index (n) per unit change in the fictive temperature ($T_f$), and the thermo-elastic coefficient (FIG. 3(b)), given as changes in density (ρ) per unit change in the fictive temperature ($T_f$), for both Cl-doped silica and F-doped silica as a function of the concentrations of Cl and F, respectively.
Figure 3B:
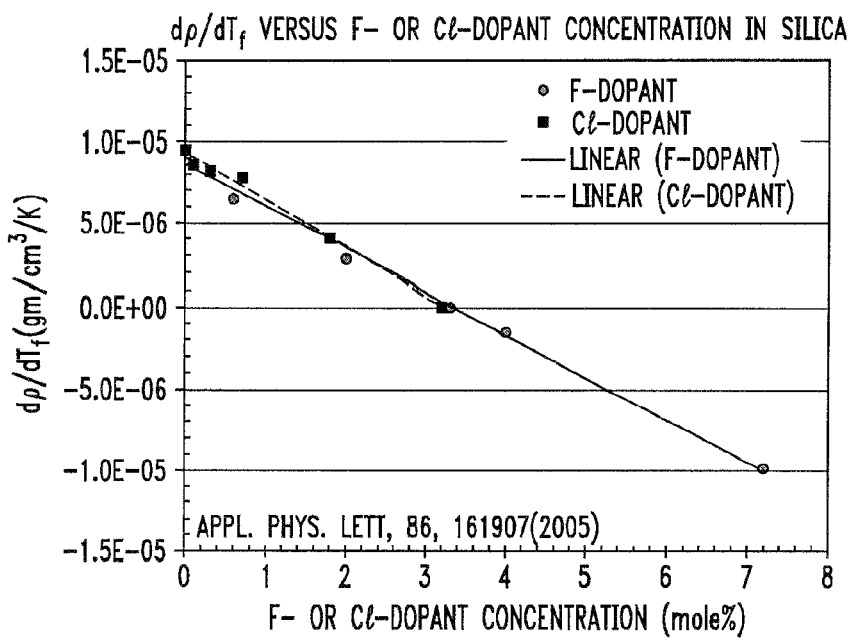

When the densities of Cl-doped core region 12 and F-doped cladding region 14 are matched, then the change in refractive index (dn) and density (dρ) as a function of fictive temperature can be thought of as indirect measures of the CTE, the thermal coefficient of expansion. FIG. 3 contains graphs of ($dn/dT_f$) and ($d\rho/dT_f$) for both Cl-doped silica and F-doped silica as a function of [Cl] and [F], respectively. In reviewing this data, it is clear that over the range where the densities can be matched, the value of $dn/dT_f$, as well as $d\rho/dT_f$ (and, therefore, CTE) is within about 20% of the practical range of [Cl] and [F].

From these plots, it is shown that when [Cl] is below the above-defined practical upper limit of 15,000 ppm, the value of [F] required to form a step-index waveguide with acceptable guiding properties is significantly more than 2.5 mol %. Since this value for [F] is significantly greater that the 1.5 mol % associated with viscosity matching, an optical fiber formed with these concentrations for a simple core and cladding structure would not exhibit the properties optimum for drawing a fiber from a preform, resulting in the presence of residual stress and stress gradients within core region 12.

The inventive optical fiber structure of the present invention overcomes this problem by including annular stress accommodation region 16, as shown in FIGS. 1(a) and (b), between core region 12 and cladding region 14. In particular, annular region 16 is formed of F-doped silica having a value of [F] in the range of 1.5 mol % (i.e., a moderately-doped value), thus providing the desired visco-elastic properties of matched core/cladding density and CTE. The inclusion of annular stress accommodation region 16 provides the necessary compensation for the remaining mis-match between the viscosity of core region 12 and cladding layer 14, with the density $d\rho/dT_f$, and refractive index $dn/dT_f$ of annular stress accommodation region 16 closely matching those of core region 12. Outer cladding region(s) 14/18 is(are) more heavily doped, forming the desired index trench that provides the required optical mode confinement, as shown in the index profile of FIG. 1(b).

When the index profile and material compositions of core region 12 and annular stress accommodation region 16 are properly designed in accordance with the practice of the present invention, the drawn fiber is found to exhibit low residual stress (as well as low stress gradients) within the combined areas of core region 12 and annular region 16. For example, an average residual stress of less than about 100 MPa is provided by the inclusion of stress-accommodation region 16. Approximately 98% of the energy of the propagating optical signal resides in these two regions.

As mentioned above, it is an advantage of the configuration of the present invention that the fraction of optical power heretofore present within the cladding region is now better confined to the central area occupied by the combination of the core and stress accommodation regions. Table I (below) shows the power distribution within the core, stress accommodation and cladding regions of an exemplary optical fiber formed in accordance with the present invention. As shown, less than two percent of the optical power propagates in the heavily F-doped cladding regions outside of the stress accommodation region of the inventive design. Table I also shows examples of the prior art, low-loss designs, where about 10% or more of the optical power propagates in the heavily F-doped regions outside of the core.

TABLE I

Percentage of Power in core region and stress accommodation region

| | 1550 nm Power fraction x100% | | |
| --- | --- | --- | --- |
| | core region 12 | stress accommodation region 16 | heavily F-doped cladding regions 14/18 |
| Design Example 1 | 83.5% | 15.8% | 0.6% |
| Design Example 2 | 83.9% | 15.3% | 0.8% |
| Designs Example 3 | 77.4% | 21.3% | 1.3% |
| Prior art low loss fiber | 90.2% | NA | 9.8% |
| Prior art low loss fiber | 77.5% | NA | 22.5% |

Figure 4:
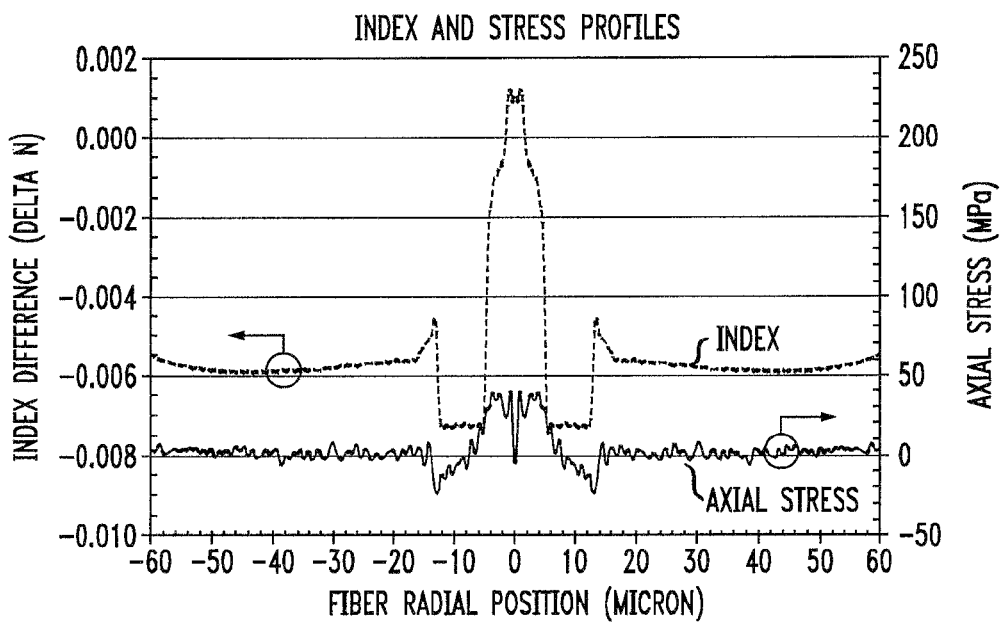
FIG. 4 is a plot of both the refractive index profile (associated with the right vertical axis) and residual stress profile (left vertical axis) of an exemplary low-loss optical fiber formed in accordance with the present invention.

FIG. 4 contains plots of refractive index (left vertical axis) and residual stress (right vertical axis) for a low-loss, Cl-doped fiber formed in accordance with the present invention. As formed, this fiber exhibited a loss of 0.174 dB/km for an optical signal propagating at a wavelength of 1557 nm. This loss value is considered to be well within the range defined as "low loss" for most applications. In this particular case, the core region was formed to include both Cl and F doping, with the relative ratios in index contributions from $SiCl_4$ and $SiF_4$ being about −3.0. That is, an addition of about 10,000 ppm by weight of Cl provides a refractive index of about 0.0013 Δn above undoped silica. Addition of about 1 mol % F. as a co-dopant reduces the refractive index value to about 0.0014 Δn below undoped silica. The fiber was drawn at a speed of 10 m/s, with an applied tension of 100 gm (a stress of about 80 MPa in a 125 μm diameter fiber). A relatively low draw temperature of 2125° C. was used in the draw process. It is contemplated that a draw speed in the range of about 3-30 m/s may be used in the formation of this fiber, with a draw tension in the range of about 25-180 gm (a stress between about 20 MPa and 145 MPa in a 125 μm fiber).

The refractive index plot shown in FIG. 4 shows raised-index core region 12, formed to include both Cl and F dopants. The next region shown in the profile corresponds to annular region 16, which is F-doped to a level that maintains viscosity matching with Cl-doped core region 12. Highly-doped (F-doped) cladding region 14 is identified by the "trench", and provides the reduction in refractive index value necessary to provide optical signal confinement in core region 12.

The residual stress present in the drawn fiber is plotted on the same radial axis, where a positive axial stress indicates tensile residual stress and a negative axial stress indicates compressive residual stress. The average residual stress magnitude is about 35 MPa in core region 12, with a maximum stress of about 75 MPa. As shown, the stress gradient comprises a relatively gradual slope at the interface with trench region 14.

An advantage of the fiber composition of the present invention is its ability to maintain a low loss characteristic when configured as large effective area fiber, one particular type of long-haul transmission fiber that finds an increasing number of uses. For example, fiber-based optical amplifiers and high power applications often utilize fibers with a relatively large effective area. In long-haul fiber optic transmission systems, utilizing fibers in the transmission span with low loss and large effective area can help to increase transmission capacity and system reach.

Figure 5:
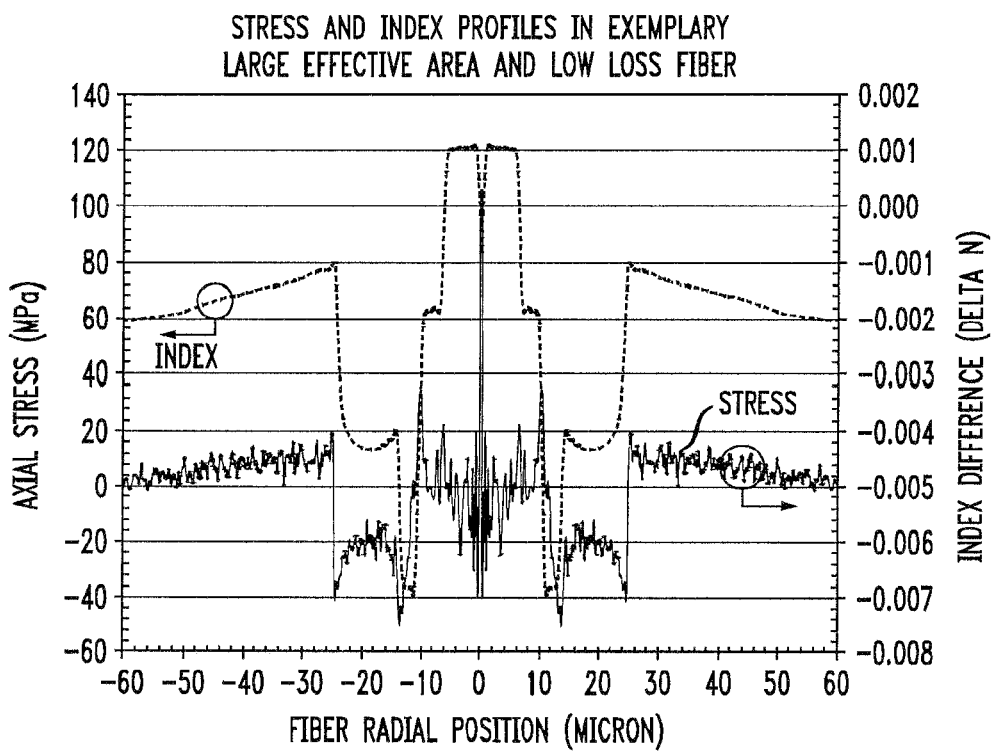
FIG. 5 is a plot of both the refractive index profile (right vertical axis) and residual stress profile (left vertical axis) of an exemplary large effective area, low-loss optical fiber formed in accordance with the present invention.

FIG. 5 contains refractive index and stress provides for an exemplary large effective area fiber formed in accordance with the present invention. In this case, the large effective area, low-loss, Cl-doped fiber was drawn from an optical preform at a speed of 5 m/s with a tension of 35 gm (about 28 MPa in a 125 μm fiber). This particular large effective area transmission fiber is fabricated to exhibit core and adjacent annular stress accommodation regions that are relatively large (in this case, with a core diameter on the order of 16 μm and stress accommodation region diameter on the order of 20 μm). The residual stress profile for this fiber is shown in Plot A (associated with the left vertical axis) of FIG. 5. Plot B (associated with the right vertical axis) is the refractive index profile for this same fiber, where it is to be noted that the "reference" index of refraction for this plot has been arbitrarily set to the value of the outer cladding, and is not the n=1.45 value usually associated with pure silica.

It is shown that low residual axial stress is obtained in both Cl-doped core region 12 and annular F-doped region 16, as indicated by region I in plot A. Low loss, on the order of about 0.169 dB/km at a wavelength of 1550 nm, was achieved at draw speeds up to 20 m/s. Further experiments showed that there was little change in loss as the draw speed was varied from 3 to 20 m/s, and the tension was varied from 35 to 75 g (associated with a stress of between 28 MPa and 60 MPa in a 125 μm fiber).

Figure 6:
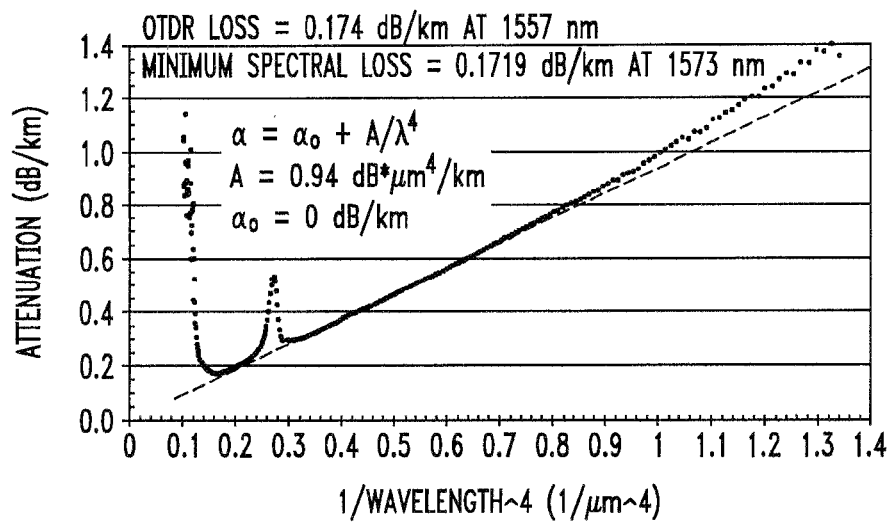
FIG. 6 is a plot of the spectral loss associated with a low-loss optical fiber having the profiles shown in FIG. 4.

As mentioned above, a motivating factor in the development of the inventive fiber structure was to retain the low loss benefits of a pure silica core (i.e., a Ge-free core), while overcoming the composition-based fabrication problems associated with the pure silica core. FIG. 6 is a graph of the spectral loss associated with the fiber whose characteristics were discussed above and are illustrated in FIG. 4. The spectral data is plotted as a function of $1/\lambda^4$, since the Rayleigh scattering has this wavelength dependence. In particular, the spectral data is defined by the following relation:

$$\alpha = \alpha_0 + A/\lambda^4,$$

where $\alpha$ denotes the attenuation along the fiber, $\alpha_0$ is an offset parameter, A is defined as the Rayleigh scattering coefficient and $1/\lambda^4$ defines the wavelength dependence. Rayleigh scattering coefficients in the range of about 0.86-0.95 dB/km*$\mu m^4$ were obtained for these experimental fibers, where these values are below those associated with typical Ge-doped silica fiber. Obviously, lower scattering loss is desirable in providing improved output optical power efficiency.

For long distance telecommunication applications, it is desirable to reduce latency (i.e., time delay) between a transmitter node and a receiver node. For a given transmission distance L, the latency $\tau$ is given by:

$$\tau = \frac{L}{c} n_g,$$

where c is the speed of light in vacuum and $n_g$ is the group refractive index of the optical fiber. Thus, in order to reduce the latency, it is critical to have the group refractive index to be as low as possible.

Figure 7:
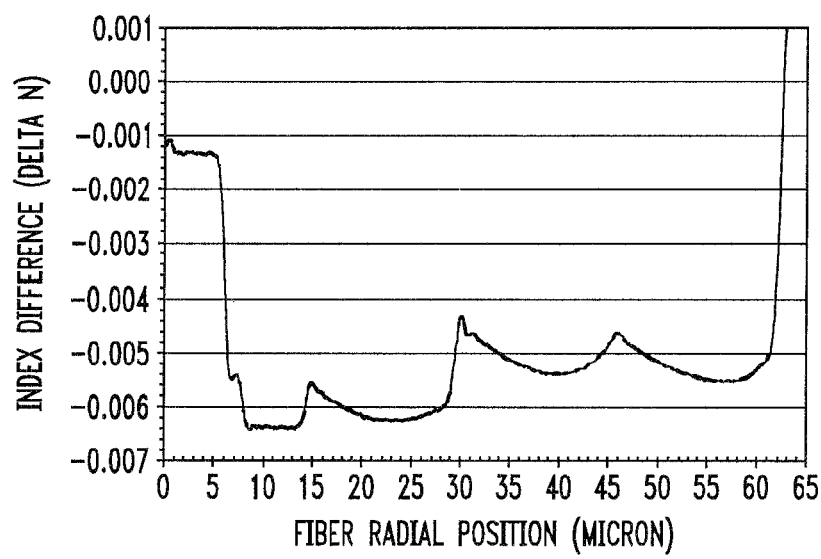
FIG. 7 illustrates the refractive index profile of an exemplary low-loss, low latency optical fiber formed in accordance with the present invention.

Advantageously, co-doping of Cl and F in the core region of a low-loss optical fiber formed in accordance with the present invention results in creating a fiber with a lower refractive index than a pure silica core fiber. The lower index in the core results in also lowering the group index value $n_g$ so as to reduce the latency of signal transmission when compared with a span comprised of pure silica core fiber. FIG. 7 is a refractive index profile of an exemplary low latency fiber of the present invention, fabricated by co-doping the core region with both Cl and F dopants. As shown, the addition of the F dopant reduced the core refractive index to a value of about −0.001 $\Delta$n. This particular fiber was configured to have an effective area ($A_{eff}$) of about 100 $\mu m^2$ and exhibited a relatively low attenuation of 0.174 dB/km at a transmission wavelength of 1550 nm. The group refractive index $n_g$ of this fiber was found to be about 1.4624 (when measured at the 1550 nm wavelength value), which is about 0.002 lower than the group refractive index value of a pure silica core fiber. Thus, a reduction in latency was demonstrated and will result in about 0.3 ms lower latency in round-trip transmission between locations that are 20,000 km apart.

There are various techniques well-known in the art for creating an optical preform from which an optical fiber is ultimately drawn. Particularly useful techniques for forming an optical preform with the Cl and F dopants described above are MCVD and VAD.

In one example, an optical preform suitable for creating a low-loss optical fiber consists of a Cl-doped silica core region that was formed from porous Ge-free silica soot that was subsequently sintered in an oxygen-free ambient containing $SiCl_4$. The oxygen-free ambient used in sintering the Ge-free silica soot can also contain He and $Cl_2$. A typical oxygen-free sintering ambient is made of flowing helium and $SiCl_4$ at about 2000 sccm total flow rate in which the $SiCl_4$ partial pressure is between 15% and 40%. The porous silica soot contains a large surface area of siloxane (SiOSi) that is highly reactive with $SiCl_4$ such that a high Cl-concentration is adsorbed on the silica soot surfaces and thus incorporated in silica upon sintering.

For those applications where it is desired to co-dope the core region to include both Cl and F dopants, $SiF_4$ may be added to the oxygen-free ambient. A partial pressure of $SiF_4$ less than 10% has been found suitable for providing an acceptable dopant level within the core.

The $SiCl_4$-dopant itself increases the refractive index to a value between 0.0006 $\Delta$n and 0.0018 $\Delta$n above silica. The higher refractive index in $SiCl_4$ doped silica provides design flexibility for large effective area fiber (see FIG. 5) in broadening the low attenuation waveguide region. A combination of $SiCl_4$ and $SiF_4$ co-dopants can result in a refractive index between −0.0015 $\Delta$n and 0.0017 $\Delta$n. The $SiCl_4$-doped silica forms a waveguide core when it is surrounded by F-doped silica cladding that has a refractive index about 0.0015 to 0.010 $\Delta$n below silica. In the silica core, the chlorine concentrations are between 6000 and 20,000 ppm and the fluorine concentrations are between 0 and 30,000 ppm.

Low-loss fiber comprising a $SiCl_4$-doped silica core in accordance with the present invention can be fabricated by modified chemical vapor deposition (MCVD), vapor axial deposition (VAD), or other preform processing methods. As discussed above, the core region can be formed either with or without $SiF_4$ co-dopant, where this co-dopant is particularly useful in situations where latency is a concern for the reasons discussed above.

When the MCVD process is used to make the core rod, F-doped silica is first deposited onto an F-doped substrate tube to form the outer cladding with a refractive index appropriate for the desired waveguide structure. Porous Ge-free silica soot is then deposited on the F-doped cladding. The porous soot is then sintered in an oxygen-free ambient containing $SiCl_4$ (with or without $SiF_4$ co-dopant, as appropriate). The tube containing the sintered core layers is then collapsed to form a solid core rod. During an initial collapse stage, an appropriate ambient at the tube interior can be chosen to contain oxygen-free $SiCl_4$ (with or without $SiF_4$) to further increase the dopant concentration. In a later collapse stage, oxygen-containing ambient can be deployed without any $SiCl_4$. Alternatively, an ambient containing $O_2$-free $SiCl_4$, helium and chlorine can be used during the collapse to reduce the draw-induced attenuation at 630 nm. Furthermore, $SiF_4$ may be introduced during collapse to achieve homogenous viscosity and thermal expansion coefficient across the core, minimizing stress gradients and providing low latency. It is known that oxygen can remove chlorine from silica. Oxygen-containing ambient during collapse can be used to tailor the Cl-concentration and F-concentration profiles to be thermo-elastically compatible with the F-doped cladding, in accordance with the present invention.

It is to be noted that the subject matter of U.S. Pat. No. 7,752,870, issued to D. Homa on Jul. 13, 2010, is related to a method of $SiCl_4$ doping in silica to reduce the presence of excess oxygen in optical fibers (to increase hydrogen resistance). However, this reference did not recognize the high chlorine doping level and resultant lower viscosity, together with the material combinations disclosed in the present invention, necessary to create desirable fiber designs.

When the VAD method is used to make the core rod, the porous Ge-free soot body is first dehydrated to remove OH that had been introduced by the VAD torches. The porous soot body is then sintered in an oxygen-free ambient containing $SiCl_4$ (again, with or without $SiF_4$). The sintered VAD core rod is over-cladded with F-doped jacket layers to form the desired waveguide structure. The sintering ambient consists of helium, $SiCl_4$ and $SiF_4$ such that the $SiCl_4$ partial pressure is between 15% and 40% and the $SiF_4$ partial pressure is between 0% and 10%.

In accordance with the present invention, the formation of an optical fiber preform having viscosity-matched core and cladding regions can be fabricated by using different concentrations of $SiCl_4$ and $SiF_4$ dopant that are introduced in different radial positions of the core and also the core/clad interface. This can be achieved by controlling the partial pressures of $SiCl_4$ and $SiF_4$ in the sintering ambient at different radial regions. The different $SiCl_4$ and $SiF_4$ dopant concentrations affect the glass viscosity and, as a result, the as-drawn axial stress profiles at different fiber radial positions. It is known that a lower stress gradient at core/clad interface can reduce fiber attenuation.

The incorporation of $SiCl_4$ with or without $SiF_4$ co-dopant in silica reduces the glass viscosity such that only a small tensile axial stress remains in the as-drawn fiber. The low residual tensile stress in the fiber core permits high fiber draw speeds above 3 m/s and limits the draw-induced core index suppression. In the low-loss fiber core compositions described in this invention, the draw-induced core index reduction is less than 0.0015 Δn relative to the preform index. Upon heat treatment during fiber splice, the core index has been found to change by less than 0.0015 Δn relative to that of the as-drawn fiber. In particular, the core index at the splice joint does not increase more than 0.0015 Δn than that about >5 cm from the splice joint.

In the process of doping porous silica soot, it has been found that oxygen-free silicon tetrachloride, $SiCl_4$, is more effective for doping and dehydration than using a molecular chlorine, $Cl_2$, treatment. The advantages stem from two fundamental distinctions. Firstly, the aggressiveness of $SiCl_4$ reaction with $SiO_2$ surface molecules enables the incorporation of high levels of chlorine concentrations into the silica matrix. This also yields an advantage in purification of OH, transition metals, and other contaminants. A typical reaction might be written in a form to emphasize the oxidation product $SiO_2$:

$$4(O_{1.5}Si\text{—}O_{0.5}[surface])+SiCl_4 => 4(1.5OSiCl)+SiO_2.$$

The high level of chlorine that is incorporated by using this method is molecularly bound as evidenced by the impact on the refractive index and, importantly, exceeds the available surface oxygen atom density. Thus, chlorine supplied by a $SiCl_4$ treatment must diffuse in part into the bulk of the silica. When using a molecular chlorine treatment, which is applied below sintering temperatures for the silica soot, high levels of molecularly bonded chlorine are not obtained.

Secondly, the advantage of higher chlorine incorporation will further assist purification by reacting with OH, impurity metalloid and metal oxides forming chlorides. These chlorides have significant volatility. Therefore, the use of oxygen-free $SiCl_4$ doping enhances the well-developed purification methods of chlorine purification of silica, as well as incorporating higher levels of chlorine within the silica that can be used to advantageously modify refractive index profiles.

The reaction of $SiCl_4$ with impurity metal oxides and metalloid oxides (the most common form of impurities in a silica matrix formed by oxidation) is substitutional with respect to the oxide. Formation of the very stable $SiO_2$ yields a thermodynamic advantage in almost all cases. Examples are:

Metalloid: $GeO_2+SiCl_4 => GeCl_4+SiO_2$

Metal: $Fe_2O_3+1.5SiCl_4 => 2FeCl_3+1.5SiO_2$

A similar advantage is gained by dehydration which is observable at room temperature with $SiCl_4$, while molecular $Cl_2$ is not effective until >800° C. Thus, a $SiCl_4$-doped silica core made by sintering the un-doped silica soot in an oxygen-free $SiCl_4$ ambient can result in very low OH content in the resultant fiber; and the OH peak in such fibers can be less than 0.33 dB/km at a wavelength of 1385 nm. The overall dehydration reaction using $SiCl_4$ is given as $$4(O_{1.5}Si\text{—}OH[surface])+SiCl_4 => 5SiO_2+4HCl.$$

Summarizing, the present invention is considered to disclose an optical fiber composition and structure having viscosities compatible with the use of an F-doped cladding layer that permit the use of preferred high-speed draw processes while preserving the low loss benefits of a pure silica core. In particular, by achieving thermo-elastic compatibility between the core, cladding and interposed annular stress accommodation region, high speed drawing process may be used without incurring significant residual stress and index suppression in the core region. Appropriate choices of Cl and F dopant concentration among the various regions of the fiber are used to achieve matching material properties between the core and adjacent annular region, as desired to maintain minimal residual stress in the core of the drawn fiber.

Ultimately, the scope of the present invention is not intended to be limited by the specific examples given above, but is defined by the claims appended hereto.

What is claimed is:

1. An optical fiber comprising
a chlorine-doped silica core region;
a fluorine-doped cladding region; and
a fluorine-doped annular stress-accommodation region disposed between the core region and the cladding region, the fluorine-doped annular stress-accommodation region including a concentration of a fluorine dopant of an amount such that the stress-accommodation region has a viscosity substantially the same as the core region,
the cladding region having a fluorine dopant concentration greater than the fluorine dopant concentration of the annular stress accommodation region for providing confinement of the propagating optical signal to the combination of the core region and the annular stress-accommodation region wherein the fluorine dopant concentration in the annular stress-accommodation region is between 0.3 mol % and 3.0 mol %.

2. The optical fiber of claim 1 wherein the core region includes a high concentration of Si—Cl bonds to provide a desired concentration of chlorine dopant.

3. The optical fiber of claim 1 wherein the core region includes chlorine dopant provided by $SiCl_4$.

4. The optical fiber of claim 1 wherein the chlorine dopant concentration in the core region and the fluorine dopant in the annular stress-accommodation are determined such that the density of the core region essentially matches the density of the annular stress-accommodation region at a determined fictive temperature $T_f$.

5. The optical fiber of claim 4 wherein the fictive temperature $T_f$ is about 1600° C.

6. The optical fiber of claim 4 wherein the optical fiber has an attenuation of less than 0.33 dB/km at a wavelength of 1385 nm.

7. The optical fiber of claim 4 wherein the chlorine dopant concentration in the silica core region is between 2000 ppm and 15,000 ppm by weight.

8. The optical fiber of claim 4 wherein the chlorine dopant concentration in the silica core region is between 2000 ppm and 15,000 ppm by weight and the fluorine dopant concentration in the annular stress-accommodation region is between 0.3 mol % and 3.0 mol %.

9. The optical fiber of claim 1 wherein the chlorine dopant concentration in the silica core region is between 2000 ppm and 15,000 ppm by weight.

10. The optical fiber of claim 1 wherein the chlorine dopant concentration in the silica core region is between 2000 ppm and 15,000 ppm by weight and the fluorine dopant concentration in the annular stress-accommodation region is between 0.3 mol % and 3.0 mol %.

11. The optical fiber of claim 1 wherein the silica core region is co-doped to include fluorine dopant in addition to the chlorine dopant.

12. The optical fiber of claim 11 wherein the optical fiber has a group refractive index lower than the group refractive index value of pure silica.

13. The optical fiber of claim 1 wherein the silica core region is substantially free of any germanium dopant.

14. The optical fiber of claim 1 wherein the chlorine dopant concentration in the core region and the fluorine dopant in the annular stress-accommodation are determined such that the fraction of optical power present in the cladding region is less than 2%.

15. The optical fiber of claim 1 wherein the optical fiber has an attenuation of less than 0.175 dB/km at a propagating signal wavelength of 1550 nm.

16. The optical fiber of claim 1 wherein the optical fiber has an effective area of more than 100 $\mu m^2$ at a wavelength of 1550 nm.

17. The optical fiber of claim 1 wherein the average residual stress is less than 100 MPa in the core region and the annular stress-accommodation region.

* * * * *